Oct. 11, 1966 R. B. GOYER 3,278,761
DIFFERENTIAL AMPLIFIER HAVING A HIGH OUTPUT IMPEDANCE FOR DIFFERENTIAL INPUT SIGNALS AND A LOW OUTPUT IMPEDANCE FOR COMMON MODE SIGNALS
Filed July 17, 1964
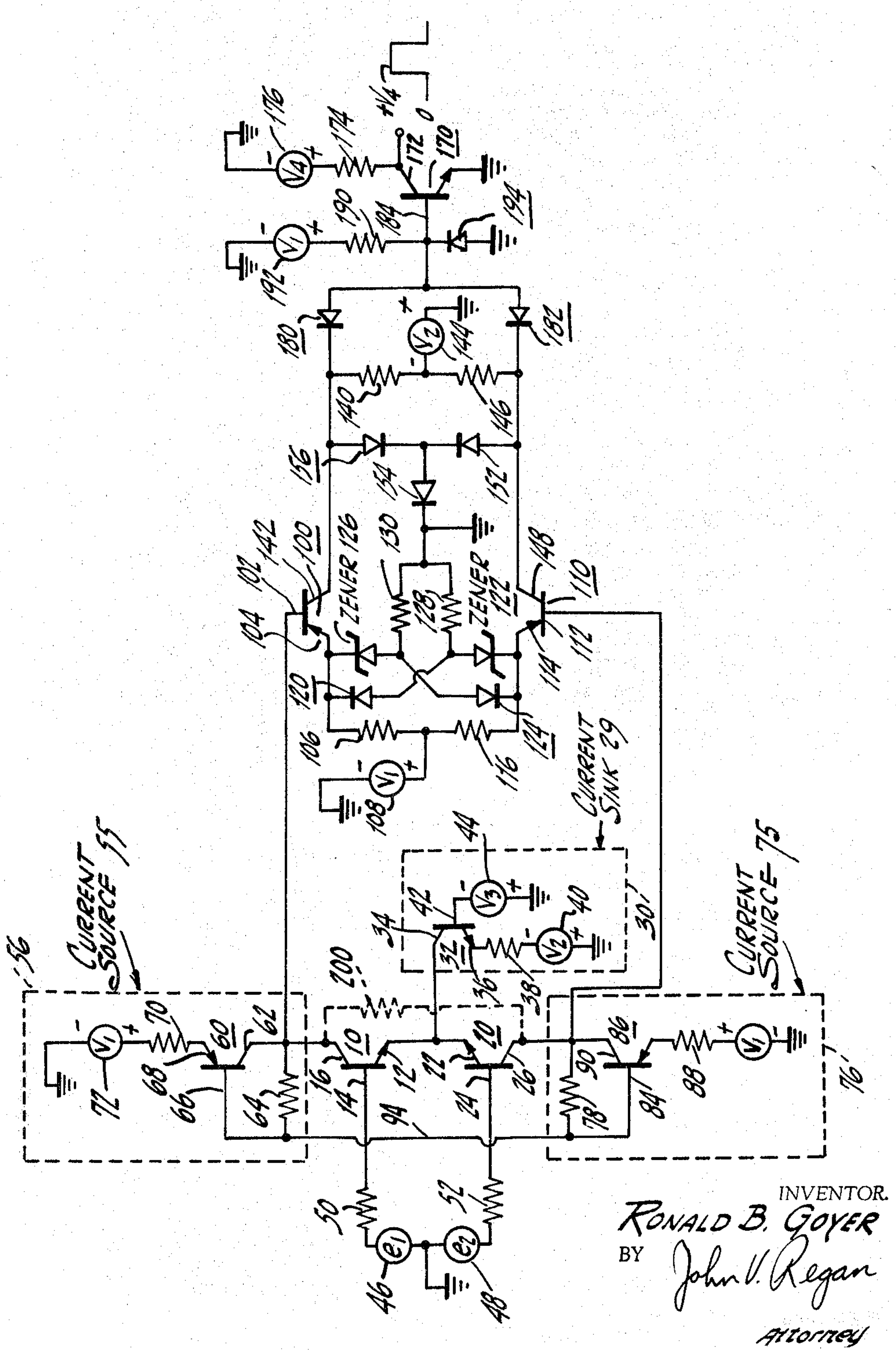
INVENTOR.
RONALD B. GOYER
BY John V. Regan
Attorney

3,278,761
DIFFERENTIAL AMPLIFIER HAVING A HIGH OUTPUT IMPEDANCE FOR DIFFERENTIAL INPUT SIGNALS AND A LOW OUTPUT IMPEDANCE FOR COMMON MODE SIGNALS

Ronald B. Goyer, North Hollywood, Calif., assignor to Radio Corporation of America, a corporation of Delaware Filed July 17, 1964, Ser. No. 383,397
13 Claims. (Cl. 307—88.5)

This invention relates to amplifier arrangements and, in particular, to differential circuit arrangements.

Although the amplifying arrangement and the individual circuits thereof have many applications, either singly or in combination, the arrangement is particularly suitable for amplifying the outputs of a high speed memory. In one known type of two-core-per-bit memory, each core of a pair is linked by a different sense winding. One core may be used to store information and the other core may be used for noise and "disturb" signal cancellation during read out. In such a scheme, the first core is switched to a reference state of magnetic remanence or to a second state of different magnetic remanence when it is desired to store a binary "0" or a binary "1," respectively. The second core always remains in the reference state.

During readout of the core pair, signals are induced on the separate sense lines linking the two cores of the pair being interrogated. The difference between the voltages induced in the separate lines may be of the order of thirty to fifty millivolts when the core pair is storing a binary "1" bit. The polarity of the voltage difference may be either positive or negative depending upon the direction in which the first core is linked by its winding. On the other hand, the potential difference between the induced signals may be of the order of only about five millivolts when the core pair is storing a binary "0" bit.

The amplifier for the read signals must be able to respond to the small potential difference regardless of its relative polarity. It is desirable that the overall amplifier arrangement provide an output indication only when the difference voltage exceeds some predetermined value indicative of the storage of a binary "1" bit. Preferably, the output should be a digital or pulse type signal that has a first voltage value when the difference voltage exceeds the predetermined value, and a second value for all other input conditions. Also, the amplifier preferably should be one that provides large amplification, or gain, for difference input signals, and little or no amplification, relatively speaking, for common mode input signals.

It is one object of this invention to provide an improved differential amplifier arrangement.

It is another object of this invention to provide a differential amplifier that provides a relatively high output impedance to differential input signals, and a relatively small output impedance to common mode signals, whereby the gain of the amplifier is much higher for differential input signals.

It is still another object of this invention to provide a circuit that operates as a differential amplifier only when the difference in amplitude between the applied input signals exceeds a predetermined value.

It is still another object of this invention to provide an amplifier arrangement for differentially amplifying, thresholding and digitizing applied input signals.

A first differential amplifier comprises first and second amplifying devices each having a first electrode connected in common to a substantially constant current means. Third and fourth amplifying devices serve as substantially constant current loads for the first and second amplifying devices, and are connected so as to provide relatively high impedance in the differential signal mode and relatively low impedance in the common signal mode.

A thresholding differential amplifier comprises a pair of amplifying devices each having a like electrode connected to a point of reference potential by way of separate resistance means. First and second branch circuits, each including threshhold means, are connected between these electrodes, the threshold means being oppositely connected in the two branches. The threshold means are biased below the threshold point in the quiescent state of the amplifier.

The outputs of the first differential amplifier may be D.C. coupled as inputs to the thresholding differential amplifier. A digital output may be derived whenever the applied input signals differ by more than a predetermined amount by coupling the outputs of the thresholding differential amplifier to a logical NOR gate.

Further objects and advantages of the differential amplifier circuitry will become apparent from a detailed discussion of the overall amplifier arrangement illustrated in the sole figure of the drawing.

The first stage of the amplifier arrangement comprises a pair of amplifying devices 10, 20, illustrated as NPN transistors, having their third, or emitter, electrodes 12, 22, respectively, connected together and to a substantially constant current means 29 located within dashed box 30. The constant current means, which may be considered a current sink for current in the conventional sense, comprises an NPN transistor 32 having its collector electrode 34 connected in common to the emitter electrodes 12, 22 and having its emitter electrode 36 connected by way of a resistor 38 to the negative terminal of a bias source 40 of $V_2$ volts. The positive terminal of source 40 is connected to a point of reference potential, indicated by the conventional symbol for circuit ground. The control electrode 42, or base electrode, is connected to a point of fixed, negative potential such as a bias source 44 of $V_3$ volts having its negative terminal connected to the base 42 and having its positive terminal grounded.

In some applications, the current means may take the form of a large resistor and bias source serially connected between circuit ground and the emitters 12, 22. The transistor circuit illustrated within dashed box 30 is preferred however, since it is more nearly an ideal constant current device. Because of the fixed bias applied at base electrode 42, current flow through the emitter 36-collector 34 path of transistor 32 is substantially independent of the voltage at the collector electrode 34.

Input signals are applied to the transistors 10 and 20 from separate signal sources 46 and 48, illustrated schematically. Source 46 is connected in series with a resistor 50 between circuit ground and the control, or base, electrode 14 of first transistor 10. Second source 48 is serially connected with a resistor 52 between circuit ground and the base electrode 24 of second transistor 20. The two sources 46, 48 may be, for example, two different sense lines in a high speed memory. It will be understood, however, that in general these sources could be almost any signal sources, and one of the sources could supply a fixed reference potential.

The collector, or output, electrode 16 of first transistor 10 is connected to a first source 55 of substantially constant current, located within dashed box 56. The current source comprises a third transistor 60 of PNP conductivity having its collector electrode 62 directly connected to the collector 16 of first transistor 10, and by way of a resistor 64, of relatively large value, to the base electrode 66. Emitter electrode 68 is connected by way of a resistor 70 to the positive terminal of a $V_1$ volt bias source 72 having its negative terminal grounded. The parameters of the current source 55 are selected in value to supply a current, in the conventional sense, having a value of approximately one-half the capacity of the current sink 29. That is to say, if the transistor 32 in the current sink 29 is biased to conduct a substantially constant current 2I milliamperes, then the parameters of the current source 55 are selected to supply a substantially constant current of approximately I milliamperes.

The collector electrode 26 of second transistor 20 is connected to a second current source 75, located with a dashed box 76, which may be the same structurally as the current source 55. Resistors 64 and 78 in the current sources 55 and 75 preferably have the same value of resistance, and the value is selected to be large compared to the value of the emitter resistors 70 and 88. Base electrodes 66 and 84 of the third and fourth amplifying devices 60, 86 are connected together by way of negligible impedance means, such as lead 94.

The second stage of the amplifier arrangement is a thresholding differential amplifier circuit comprising a pair of transistors 100, 110, illustrated as PNP transistors. The base electrodes 102 and 112 of the transistors 100 and 110 are directly connected to the collector electrodes 16 and 26 of the transistors 10 and 20 in the first stage. Emitter electrode 104 of transistor 100 is connected by way of a resistor 106 to the positive terminal of a bias source 108 of $V_1$ volts, the negative terminal of the source 108 being grounded. In a similar manner, the emitter electrode 114 of transistor 110 is connected to the positive terminal of the source 108 by way of a resistor 116.

A first unidirectional conducting device 120, illustrated as a conventional diode, and a two terminal threshold device 122, illustrated as a Zener type diode, are serially connected between the emitter electrodes 104 and 114. Conventional diode 120 is connected to pass current in the conventional sense, flowing through the series path from the emiter 114 circuit toward the emitter 104 circuit of transistor 100. The Zener diode 122 is connected in a direction to pass current in its reverse, or Zener, direction when the conventional diode 120 conducts. A second series branch comprising a second unidirectional conducting device 124 and a seond Zener diode 126 is also connected between the emitter electrodes 104 and 114. Second unidirectional conducting device 124 is poled, or connected to pass current, in the conventional sense, flowing in the series path from the emitter 104 circuit toward the emitter 114 circuit, and the second Zener diode 124 is connected to conduct current in its reverse direction when the unidirectional device 124 conducts.

A resistor 128 is connected between ground and the junction of Zener diode 122 and unidirectional conducting device 120. A second resistor 130 is connected between circuit ground and the junction of second Zener diode 126 and second unidirectional conducting device 124. Resistors 128 and 130 are provided for the purpose of supplying some reverse current to the associated Zener diodes 122 and 126, respectively, when the unidirectional conducting devices 120 and 124 are reverse biased. The values of the bias resistors 128 and 130 are selected so that the Zener diodes are biased close to, or at, their Zener breakdown voltage values.

A current supply resistor 140 is connected between the collector electrode 142 of transistor 100 and the negative terminal of a bias source 144 of $V_2$ volts. The posititve terminal of source 144 is grounded. A second current supply resistor 146 is connected between the negative terminal of bias source 144 and the collector electrode 148 of transistor 112. The voltage at collector electrode 148 is prevented from going more than a small amount positive relative to ground potential by the series combination of clamp diodes 152 and 154 connected between collector 148 and circuit ground. In a similar manner, the voltage at collector electrode 142 is prevented from going more than a slight amount positive relative to ground potential by the series combination of clamp diodes 154 and 156. The clamp diodes prevent transistors 100 and 110 from saturating in response to a large differential input. Also, they establish one of two voltage levels possible at either collector electrode 142, 148 in a manner to be described.

The third stage of the amplifier arrangement is a digitizing circuit which operates to perform the logical NOR function. The stage includes an NPN transistor 170 connected in the grounded emitter configuration and having its collector electrode 172 connected by way of a resistor 174 to the positive terminal of a bias source 176 of $V_4$ volts. The negative terminal of source 176 is grounded. The output voltages of the transistors 100 and 110 in the second stage are coupled by way of input diodes 180 and 182, respectively, to the base electrode 184 of output transistor 170. A resistor 190 and a diode 194 are connected in series, in that order, between the positive terminal of a bias source 192 of $V_1$ volts and circuit ground, with the base electrode 184 connected at the junction of the resistor 190 and diode 194. When the voltage applied at the base electrode 184 by way of either of the input diodes 180 and 182 is less than ground potential, diode 194 becomes forward biased and clamps the voltage at the base electrode 184 at a slightly negative potential. Output transistor 170 then is biased in a nonconducting condition, and the output voltage at collector electrode 172 is approximately $+V_4$ volts. Whenever the voltages at both collector electrodes 142 and 148 are clamped at a positive potential by their respective clamp diodes, the voltage of base electrode 184 becomes sufficiently positive relative to ground potential to saturate output transistor 170. The voltage at collector electrode 172 then is close to ground potential.

*Circuit operation*

Consider now the operation of the circuit. It will be noted that the first and second stages are balanced circuits. That is to say, transistor 10 and its related circuitry are structurally the same as transistor 20 and its related circuitry, and the resistors and bias voltages in the upper and lower halves of the first stage may have the same value. In like manner, transistor 100 and its related circuitry in the second stage are the same structurally as transistor 110 and its related circuitry. Accordingly, in the quiescent state of the circuit with no input signals supplied by signal sources 46 and 48, the voltages at corresponding points in the upper and lower portions of the circuit are the same. For example, the voltage at the base electrode 14 of transistor 10 is the same as the voltage at the base electrode 24 of transistor 20.

Both transistors 10 and 20 conduct equal amounts of current in the quiescent state and, assuming equal collector load impedances, the voltages at collector electrodes 16 and 26 have the same valve. This means that the transistors 100 and 110 in the second stage also conduct equal amounts of current, assuming of course that the emitter resistors 106 and 116 have the same value. Both of the transistor 100 and 110 circuits operate as emitter-followers at this time. With equal voltages at the emitter electrodes 104 and 114, the unidirectional conducting devices 120 and 124 are reverse biased. Clamp diodes 152, 154, and 156 conduct, and the voltages at the collector electrodes 142 and 148 are positive relative to ground by an amount equal to the sum of two diode voltage drops. Assuming silicon clamp diodes with forward voltage drops of 0.7 volt each, the voltages at the collector electrodes 142 and 148 may be of the order of +1.4 volts in the quiescent condition of the circuit.

The values of the emitter resistors 106, 116, collector resistors 140, 146 and bias sources 108 and 144 are chosen so that the clamp diodes conduct and clamp the voltages at the collector electrodes 142, 148 at the aforementioned value so long as the respective transistors 100, 110 conduct. As will be apparent from a later discussion, both transistors 100 and 110 conduct until the voltage across one of the Zener diodes 122, 126 reaches the Zener voltage value, and the associated unidirectional conducting device 120 or 124 is forward biased.

With 1.4 volts at each collector electrode 142 and 148, both of the input diodes 180 and 182 to the output stage are reverse biased, and the voltage at the base electrode 184 is positive relative to ground potential. Output transistor 170 conducts in saturation, and the output voltage at collector electrode 172 is approximately at ground potential, which may be considered the normal output voltage.

Consider now the manner in which the circuit responds to applied input signals. There are three basic types of input signal conditions, namely (a) a pure common mode in which both of the input sources 46, 48 supply signals of the same amplitude and polarity, (b) differential mode in which only one source supplies an input signal, or where the two sources supply signals of opposite polarity, and (c) differential mode in which the two sources supply signals of the same polarity but of different amplitude. The manner in which the circuit responds to applied input signals for the different conditions is a function of the loading at the collector electrodes 16 and 26 of transistors 10 and 20. It is one feature of this invention that the loading is variable to provide high gain for differential input signals and a relative small gain for common mode signals. This feature will now be described in detail.

Consider the characteristics of current source 55 alone and disregard the short 94 between the base electrodes 66 and 84 of transistors 60 and 86. It can be shown that the output impedance $Z_{out}$ at collector 62, under A.C. signal conditions, is as follows:

$$Z_{out}=R_{70}+(1-\alpha)R_{64}$$

In the above equation, $\alpha$ is the alpha of transistor 60, $R_{70}$ is the resistance of emitter resistor 70, and $R_{64}$ is the resistance of resistor 64. Since $\alpha$ is close to unity for most transistors $(1-\alpha)R_{64}$ is relatively small, and the emitter resistor 70 is essentially reflected to the collector 62 as the predominant load, as seen at the output of transistor 10. In like manner, and again neglecting the short between base electrodes 66 and 84, the emitter resistor 88 of transistor 86 is reflected to the collector 90 as the predominant load at the output of transistor 20.

On the other hand, it can be shown that the output impedance at collector 62 is approximately $R_{64}$ when there is an effective A.C. short at base electrode 66. Under this condition, the bias on transistor 60 is essentially constant, the signal current for transistor 10 flows through resistor 64, and the transistor 60 operates as a very high impedance, constant current device. Loading then is independent of emitter resistor 70. In like manner, the output impedance at collector electrode 26 is the resistor 78 when the base 84 of transistor 86 is at A.C. ground.

It can be seen from the above discussion that the loadings at the collectors of transistors 10 and 20 are dependent upon the operating conditions imposed at the base electrodes 66 and 84, respectively. In the pure common mode type of operation, signal sources 46 and 48 apply signals of equal amplitude and polarity at base electrodes 14 and 24, respectively. Assume that positive going signals are applied. Since the circuit is balanced, the current flowing through each of the transistors is increased by the same amount $\Delta I$.

The increase in current flow through resistor 64 is approximately $(1-\alpha)\Delta I$, and equals the increase in current flow through resistor 78. Since those currents are equal and both flow in the same relative direction, namely toward the collector electrodes 16 and 26 respectively, there is no current flow through the short between base electrodes 66 and 84. Consequently, it is as though this short did not exist. Under these conditions, there is no A.C. short at the base electrodes 66 and 84. For reasons discussed previously, the load impedance at collector 16 is approximately the value of emitter resistor 70, and the load impedance seen at the collector 26 is approximately the value of emitter resistor 88. These resistors preferably are of equal value, whereby the voltages at collectors 16 and 26 both experience the same change in the pure common mode operation.

Moreover, by selecting emitter resistors 70 and 88 of relatively small value, amplification of common mode signals may be held to a relatively small value. The use of a constant current sink 29 in the common emitter circuit of transistors 10 and 20 also aids in providing excellent common mode rejection. Since the voltages at collector electrodes 16 and 26 are equal in the common mode, the transistors 100 and 110 in the second stage conduct equal amounts of current. The emitter 104, 114 voltages are equal, and neither unidirectional conducting device 120, 124 becomes forward biased. Thus, the collector 142, 148 voltages remain clamped at a slightly positive value, output transistor 170 remains in saturation, and the output voltage remains close to ground potential.

Consider now the second mode, the differential mode of operation in which only one of the sources 46, 48 supplies a signal, or in which the sources both supply signals but of opposite polarity. Let it be assumed that the voltage at base electrode 14 becomes more positive and that the voltage at base electrode 24 remains at the quiescent value. As a result of the substantially constant current sink 29, the increase $\Delta I$ in transistor 10 current is matched by a decrease $\Delta I$ in transistor 20 current. Since the circuit is balanced, the voltage at collector 16 decreases an amount $\Delta V$, while the voltage at collector 26 increases an amount $\Delta V$.

There is now a difference of $2\Delta V$ volts between the voltages at collectors 16 and 26, and current flows, in the conventional sense, from the junction of collectors 26 and 90, through resistor 78, shorting lead 94, and resistor 64 to collector electrode 16. Assuming that resistors 64 and 78 are of equal value, there is no net change in voltage at base electrodes 66 and 84. In other words, there is an effective A.C. short to ground at each of these electrodes. The bias voltages at base electrodes 66 and 84 remain at their quiescent value, and the transistors 60 and 86 operate as very high impedance, constant current sources. Under these conditions, as discussed previously, the transistor 10 sees an output impedance of $R_{64}$ and the transistor 20 sees an equal output impedance of $R_{78}$.

All of the $\Delta I$ increase in current for transistor 10 is supplied by current source 75. The total current supplied by source 75 remains unchanged, however, since the transistor 20 current decreases an amount $\Delta I$. The $\Delta I$ increase in current flows from source 75 through resistors 78 and 64 to the collector 16 of transistor 10. The difference in voltage between collector 16 and collector 26 is $\Delta I(R_{78}+R_{64})$. It is apparent that the differential gain is a function of the resistance values of these resistors 64 and 78. By selecting the resistance values to be much larger than the values of emitter resistors 70 and 88, the first stage may have a relatively large gain in the differential mode as compared to the gain in the common mode.

The output loads of transistors 10 and 20 are resistive in nature, whereby linear differential gain is achieved. Moreover, the gain is constant from D.C. up to the cutoff frequencies of the transistors, since the loading is essentially constant for differential input signals from D.C. up to the cutoff frequency. This has the advantage that pulse type differential input signals may be amplified without distortion of the signal waveforms.

Under certain circumstances, it is desirable to sacrifice some of the gain in the first stage in favor of an increase in the bandwidth. This may be accomplished by connecting a resistor 200, shown in dashed lines, directly between the collector electrodes of the transistors 10 and 20. This resistor 200 provides negative feedback. By proper selection of the values of the resistors 64, 78 and 200, a very large differential gain may be achieved by the resistors 64

78, and the resistor 200 then may increase the bandwidth at a sacrifice in gain while still achieving a very large gain for differential input signals.

Consider now the operation of the second stage. For the differential input signal condition just described, the voltage at the base electrode 102 of transistor 100 becomes less positive and the voltage at base electrode 112 becomes more positive relative to circuit ground. This causes the voltages at emitter electrodes 104 and 114 to become less positive and more positive, respectively. Transistors 100 and 110 operate essentially as emitter followers until the differential input voltage reaches a predetermined value, at which the difference in the emitter 104, 114 voltages is sufficient to forward bias one of the undirectional conducting devices 120, 124 and, in turn to further bias the associated one of the Zener type diodes 122, 126 in the Zener breakdown region of constant voltage.

For a difference input voltage below the predetermined volue, both transistors 100, 110 remain in conduction. Diodes 154 and 156 clamp the collector 142 voltage at a slightly positive voltage, and diodes 152 and 154 clamp the collector 148 voltage at a slightly positive voltage. The voltage at the base 184 of output transistor 170 remains positive, transistor 170 is biased in saturation and the output voltage at collector electrode 172 is close to ground potential.

Let it be assumed that the difference input voltage exceeds the predetermined volue aforementioned, and that the base 112 voltage is more positive than the voltage at base 102. Unidirectional conducting device 120 becomes forward biased; Zener type device 122 acts as a constant voltage device since it has been biased very near or at the Zener value. Transistor 110 then turns off, and emitter 104 current flows from source 108 through two parallel paths. The first path comprises resistor 106, and the second path comprises the series combination of resistor 116, Zener type diode 122 and unidirectional conducting device 120.

When transistor 110 turns off, clamp diode 152 becomes reverse biased, and the voltage at collector electrode 148 falls in a negative direction because of the bias source 144. A negative voltage is passed by coupling diode 182 to the base electrode 184, and diode 194 becomes forward biased to clamp the base 184 voltage slightly negative relative to ground potential. This negative voltage turns off output transistor 170, and the output voltage rises close to $V_4$ volts, indicating that the difference input voltage is greater than a predetermined amount.

Because of the various diodes 152, 154, 156, 180, 182 and 194, the collector 142 and 148 voltages have either one of two levels. The same is true of the base 184 voltage for output transistor 170. For example, assume that all of these diodes are silicon devices having a forward voltage drop of 0.7 volt. When both transistors 100 and 110 are conducting, the collector 142 and 148 voltages are clamped at +1.4 volts by diodes 152, 154 and 156. Coupling diodes 180 and 182 are reverse biased and output transistor 170 conducts. Assuming a silicon transistor 170, the base 184 voltage is about 0.7 volt positive relative to ground by virtue of the drop across the base-emitter junction of the transistor 170.

When one of the transistors 100, 110 is nonconducting, its associated coupling diode 180 or 182 and the base clamp diode 194 are forward biased. The base 184 voltage is about −0.7 volt, and the collector 142 or 148 voltage of the off transistor is about −1.4 volt. It is seen, therefore, that the collector 142 or 148 voltage has a value of either +1.4 volts or −1.4 volts, for a total swing of 2.8 volts. The base 184 voltage is either +0.7 volt or −0.7 volt, for a total swing of 1.4 volts. This small swing is advantageous in that any capacitive loading on the lines need be charged and discharged only a few volts, thereby minimizing circuit delay. Noise immunity is achieved by virtue of the threshold voltage values of the diodes 180 and 182.

In the differential mode of operation wherein both signal sources 46 and 48 provide signals of the same polarity, but of different amplitude, circuit operation is a combination of the common mode and differential mode operation described above. Only the difference input voltage is differentially amplified.

One of the advantages of the overall amplifier arrangement is that D.C. coupling is employed throughout. There are no reactive elements which need be charged and discharged, whereby the circuit may operate at high frequency. Also, there is no problem of level shift due to reactive components.

Various modifications may be made in the circuit without departing from the spirit of the invention. For example, transistors of opposite conductivity type to those shown may be employed, provided that the connections to the various diodes, bias sources, unidirectional conducting devices and Zener type devices are reversed. Also, the unidirectional conducting devices 120, 124, Zener type devices 122, 126 and resistors 128 and 130 all could be replaced by the single series combination of a pair of back-to-back Zener diodes, or by a double anode Zener device having suitable high frequency characteristics.

By way of example only, and not intending to be limited thereto, the components of the circuit may have the following values:

| | | |
|---|---|---|
| Transistors: | | |
| 10 | | 2N2221 |
| 20 | | 2N2221 |
| 32 | | 2N2221 |
| 60 | | 2N869 |
| 86 | | 2N869 |
| 100 | | 2N869 |
| 110 | | 2N869 |
| 170 | | 2N2501 |
| Diodes: | | |
| All | | 1N914 |
| Zener diodes: | | |
| 122, 126 | | PD6008 |
| Resistors: | | |
| 38 | ohms | 1.1K |
| 64, 78 | do | 13K |
| 70, 88 | do | 1.1K |
| 106, 116 | do | 1.1K |
| 128, 130 | do | 50K |
| 140, 146 | do | 6.5K |
| 174 | do | 1.2K |
| 190 | do | 15K |
| 200 | do | 4.7K |
| Bias sources: | | |
| $V_1$ | volts | 18 |
| $V_2$ | do | 18 |
| $V_3$ | do | 6 |
| $V_4$ | do | 9 |

What is claimed is:

1. The combination comprising:

a first and second amplifying devices each having a control electrode, an output electrode, and a third electrode defining a current path with said output electrode;

a point of reference potential;

a first substantially constant current means connected in common between said point of reference potential and each said third electrode;

second and third substantially constant current means each connected between a different said output electrode and said point of reference potential;

resistance means connected in a bidirectional current path between the output electrode of the first amplifying device and the output electrode of the second amplifying device; and first and second input means each connected to a different said control electrode.

2. The combination comprising:

first and second amplifying devices each having an output electrode, a control electrode, and a third electrode defining a current carrying path with said output electrode;

a point of reference potential;

substantially constant current means connected in common between each said third electrode and said point of reference potential;

third and fourth amplifying devices each having a control electrode, an output electrode, and a third electrode;

means connecting the output electrode of the third amplifying device to the output electrode of the first amplifying device, and connecting the output electrode of the fourth amplifying device to the output electrode of the second amplifying device;

means including a first resistor connected between the third electrode of said third amplifying device and said point of reference potential;

means including a second resistor connected between the third electrode of said fourth amplifying device and said point of reference potential;

a third resistor connected between the output and control electrodes of the third amplifying device;

a fourth resistor connected between the output and control electrodes of the fourth amplifying device;

negligible impedance means connected between the control electrodes of the third and fourth amplifying devices; and first and second input means each connected to the control electrode of a different one of said first and second amplifying devices.

3. The combination comprising:

first and second transistors of like conductivity type each having a collector, a base and an emitter;

a point of reference potential;

first substantially constant current means which is a current sink for current of a first polarity sense;

means connecting the emitters of the first and second transistors together and by way of said first current means to said point of reference potential;

second and third substantially constant current means each conected between the collector of a different transistor and said point of reference potential, said second and third current means being current sources for current of said first polarity sense;

resistance means connected in a feedback path between the collector of the first transistor and the collector of the second transistor and having an impedance value that is greater than the impedances of the second and third current means; and first and second input means each connected to the base of a different one of said first and second transistors.

4. The combination comprising:

first and second transistors of a first conductivity type each having a base, a collector and an emitter;

a point of reference potential;

substantially constant current means connected in common between each said emitter and said point of reference potential;

third and fourth transistors of a second, opposite conductivity type;

means connecting the collector of the third transistor to the collector of the first transistor and connecting the collector of the fourth transistor to the collector of the second transistor;

means including a first resistor of relatively small value connected between the emitter of the third transistor and said point of reference potential;

means including a second resistor of relatively small value connected between the emitter of the fourth transistor and said point of reference potential;

a third resistor of relatively large value connected between the collector and base of the third transistor;

a fourth resistor of relatively large value connected between the collector and base of the fourth transistor;

relatively negligible resistance means connecting the base of the third transistor to the base of the fourth transistor; and first and second input means each coupled to the base of a different one of said first and second transistors.

5. The combination comprising:

first and second transistors of a first conductivity type each having a base, a collector and an emitter;

a point of reference potential;

substantially constant current means connected in common between each said emitter and said point of reference potential;

third and fourth transistors of a second conductivity type different from said first conductivity type;

means connecting the collectors of the third and fourth transistors to the collectors of the first and second transistors, respectively;

means including a first resistor of relatively small value connected between the emitter of the third transistor and said point of reference potential;

means including a second resistor of the same said relatively small value connected between the emitter of the fourth transistor and said point of reference potential;

a third resistor of relatively large value connected between the collector and base of the third transistor;

a fourth resistor of the same said relatively large value connected between the collector and base of said fourth transistor;

negligible impedance means connected between the base of the third transistor and the base of the fourth transistor;

means quiescently biasing the first and second transistors into conduction; and first and second input means each coupled to the base of a different one of the first and second transistors.

6. The combination comprising:

first and second transistors of a first conductivity type each having a base, a collector and an emitter;

a point of reference potential;

substantially constant current means connected in common between said point of reference potential and each said emitter;

third and fourth transistors of a second conductivity type different from said first conductivity type;

means connecting the collectors of the first and second transistors to the collectors of the third and fourth transistors, respectively;

means including a first resistor of relatively small value connected between the emitter of the third transistor and said point of reference potential;

means including a second resistor of relatively small value connected between the emitter of the fourth transistor and said point of reference potential;

a third resistor of relatively large value connected between the collector and base of the third transistor;

a fourth resistor of relatively large value connected between the collector and base of the fourth transistor;

negligible impedance means connected between the bases of the third and fourth transistors;

a fifth resistor connected between the collectors of the first and second transistors; and first and second input circuit means connected to the bases of the first and second transistors respectively.

7. The combination comprising:

first and second amplifying devices each having a control electrode, an output electrode, and a third electrode defining a current carrying path with said output electrode;
a point of reference potential;
circuit means including a first resistor connected between the third electrode of the first amplifying device and said point of reference potential;
circuit means including a second resistor connected between the third electrode of the second amplifying device and said point of reference potential;
first and second oppositely poled threshold means connected, in first and second direct current circuit paths, respectively, between the third electrodes of said first and second amplifying devices;
output circuit means connected at the output electrode of at least one of the amplifying devices by way of a biased diode responsive to the turning on and off of said one of said devices; and
first and second input means connected at the control electrodes of the first and second amplifying devices, respectively.

8. The combination comprising:
first and second amplifying devices each having a control electrode, an output electrode, and a third electrode defining a current carrying path with the output electrode;
a point of reference potential;
circuit means including a first resistor connected between the third electrode of the first amplifying device and said point of reference potential;
circuit means including a second resistor connected between the third electrode of the second amplifying device and said point of reference potential;
first and second unidirectional conducting means connected respectively, in first and second direct current branch circuits between the third electrodes of the first and second amplifying devices, with said first and second means being connected to conduct current in first and second, opposite directions, respectively;
means quiescently biasing the first and second amplifying devices to quiescently bias the first and second threshold means below their thresholds of conduction;
means for applying input signals at the control electrode of at least one of said amplifying devices; and output means connected at the output electrode of at least one of the amplifying devices and having a threshold which is exceeded when said one of said devices turns off.

9. The combination comprising:
first and second transistors of like conductivity type each having an emitter, a collector and a base;
a point of reference potential;
an emitter circuit connected between the emitter of the first transistor and said point of reference potential and including a first resistor;
an emitter circuit connected between the emitter of the second transistor and said point of reference potential and including a second resistor;
a first unidirectional conducting diode and a first Zener diode serially connected between the emitters of the first and second transistors, with one electrode of the first unidirectional diode being connected to the like electrode of the first Zener diode and with the first unidirectional diode poled to pass current in a first direction relative to the emitter electrodes;
a second unidirectional conducting diode and a second Zener diode serially connected between said two emitter electrodes, with one electrode of the second unidirectional diode connected to the like electrode of the second Zener diode and with the second unidirectional diode poled to pass current in a second direction, opposite said first direction, relative to the two emitter electrodes;
first bias circuit means connected between said like electrode of said first Zener diode and said point of reference potential for quiescently biasing said first Zener diode close to its Zener voltage value;
second bias circuit means connected between said like electrode of said second Zener diode and said point of reference potential for quiescently biasing said second Zener diode close to its Zener voltage value;
output means connected at the collector electrode of at least one of said first and second transistors; and
first and second input means connected at the bases of the first and second transistors, respectively.

10. The combination comprising:
first and second transistors of like conductivity type each having an emitter, a collector and a base;
a point of reference potential;
an emitter circuit connected between the emitter of the first transistor and said point of reference potential and including a first resistor;
an emitter circuit connected between the emitter of the second transistor and said point of reference potential and including a second resistor;
a first unidirectional conducting diode and a first Zener diode serially connected between the emitters of the first and second transistors, with one electrode of the first unidirectional diode being connected to the like electrode of the first Zener diode and with the first unidirectional diode poled to pass current in a first direction relative to the emitter electrodes;
a second unidirectional conducting diode and a second Zener diode serially connected between said two emitter electrodes, with one electrode of the second unidirectional diode connected to the like electrode of the second Zener diode and with the second unidirectional diode poled to pass current in a second direction, opposite said first direction, relative to the two emitter electrodes;
first bias circuit means connected between said like electrode of said first Zener diode and said point of reference potential for quiescently biasing said first Zener diode close to its Zener voltage value;
second bias circuit means connected between said like electrode of said second Zener diode and said point of reference potential for quiescently biasing said second Zener diode close to its Zener voltage value;
output means connected at the collector electrode of at least one of said first and second transistors; and
first and second input means connected at the bases of the first and second transistors, respectively, and including means quiescently biasing the transistors to reverse bias each of the first and second unidirectional diodes.

11. The combination comprising:
first and second transistors of like conductivity type each having a collector, a base and an emitter;
a point of reference potential;
a first substantially constant current means connected in common between said point of reference potential and the emitter electrode of each transistor;
second and third substantially constant current means each connected between said point of reference potential and the collector of a different one of said first and second transistors;
resistance means connected in a current path between the collectors of the first and second transistors;
first and second input means each connected to the base of a different one of said first and second transistors;
third and fourth transistors of like conductivity type to each other, each having a base, an emitter and a collector;
means direct current coupling the collector of the first transistor to the base of the third transisor, and the collector of the second transistor to the base of the fourth transistor;

means including a first resistor connected between the emitter of the third transistor and said point of reference potential;

means including a second resistor connected between the emitter of the fourth transistor and said point of reference potential;

first and second unidirectional conducting threshold means connected in different branch circuits between the emitter electrodes of the third and fourth transistors, with said first and second threshold means being connected to conduct current in first and second, opposite directions, respectively; and output means connected at the collector electrode of at least one of the third and fourth transistors.

12. The combination comprising:

first and second transistors of a first conductivity type each having a collector, a base and an emitter;

a point of reference potential;

substantially constant current means connected in common between said point of reference potential and the emitter electrodes of the first and second transistors;

third and fourth transistors of a second, different conductivity type having their bases connected together by negligible impedance means and having their collectors connected to the collectors of the first and second transistors, respectively;

means including first and second resistors of relatively small value respectively connected between the point of reference potential and the emitter of the third and fourth transistors;

a third resistor of relatively large value connected between the base and collector of the third transistor;

a fourth resistor of relatively large value connected between the base and collector of said fourth transistor;

first and second input means each connected to the base of a different one of said first and second transistors;

fifth and sixth transistors of said second conductivity type each having a base, an emitter and a collector;

means direct current coupling the collector of the first transistor to the base of the fifth transistor, and the collector of the second transistor to the base of the sixth transistor;

means including a fifth resistor connected between the emitter of the sixth transistor and said point of reference potential;

means including a sixth resistor connected between the emitter of the sixth transistor and said point of reference potential;

the series combination of a first unidirectional conducting device and a first Zener diode connected between the emitters of the fifth and sixth transistors, the first unidirectional conducting device being connected to pass current flowing in a direction from the emitter of the fifth transistor toward the emitter of the sixth transistor;

the series combination of a second unidirectional conducting device and a second Zener diode connected between the emitters of the fifth and sixth transistors, the second unidirectional conducting device being connected to pass current flowing in a direction from the emitter of the sixth transistor toward the emitter of the fifth transistor;

means biasing each of the first and second Zener diodes close to its Zener voltage value; and first and second circuit means connecting the collector electrodes of the third and fourth transistors, respectively, to said point of reference potential.

13. The combination as claimed in claim 12 including a two-input gate having each of its two inputs direct current coupled to the collector of a different one of said fifth and sixth transistors.

References Cited by the Examiner

UNITED STATES PATENTS

| | | | |
|---|---|---|---|
| 2,890,335 | 6/1959 | Gibbon | 328—115 |
| 3,052,852 | 9/1962 | Logan | 307—88.5 X |
| 3,077,566 | 2/1963 | Vosteen. | |
| 3,156,834 | 11/1964 | Stillwell | 307—88.5 |
| 3,175,103 | 3/1965 | Kline | 328—149 X |

OTHER REFERENCES

Hilbiber: A New D.C. Transistor Differential Amplifier, Fairchild Technical Article TP–16, February 1961.

Middlebrook et al.: Differential Amplifier With Regulator Achieves High Stability, Low Drift, Electronics (magazine) July 28, 1961, pages 56–59.

Beneteau: The Design of High Stability D.C. Amplifiers, Fairchild Application Data, April 1961.

ARTHUR GAUSS, *Primary Examiner.*

I. C. EDELL, *Assistant Examiner.*